March 22, 1927.

H. F. RUGGLES

SLING HOOK

Filed Aug. 11, 1922

1,621,604

Horace F. Ruggles INVENTOR
BY
Thomas Howe ATTORNEY

Patented Mar. 22, 1927.

UNITED STATES PATENT OFFICE.

HORACE F. RUGGLES, OF BROOKLYN, NEW YORK.

SLING HOOK.

Application filed August 11, 1922. Serial No. 581,057.

This invention relates to trip hooks whereby the slings of sugar cane hoists are secured about the loads of cane. While useful in such application, the invention is not limited thereto.

The bundles of cane hoisted usually weigh two or three tons which necessitates that the supporting structure including the trip hook shall be strong and rugged. Also because of the large weight carried, the weight is liable to bind the trip so that it is dislodged only with the application of great force. This binding also is liable to make the tripping of the hook uncertain so that the slings, of which there are several, about a bundle of cane may trip at different times so that one end of the bundle will be released before the other and the bundle dropped in confusion with resulting trouble and loss of time.

The main objects of the present invention are to provide a sling hook which shall be strong and rugged and easily and certainly tripped.

Other and ancillary objects of the invention will appear hereinafter.

In the accompanying drawings which illustrate the invention—

Figure 1:
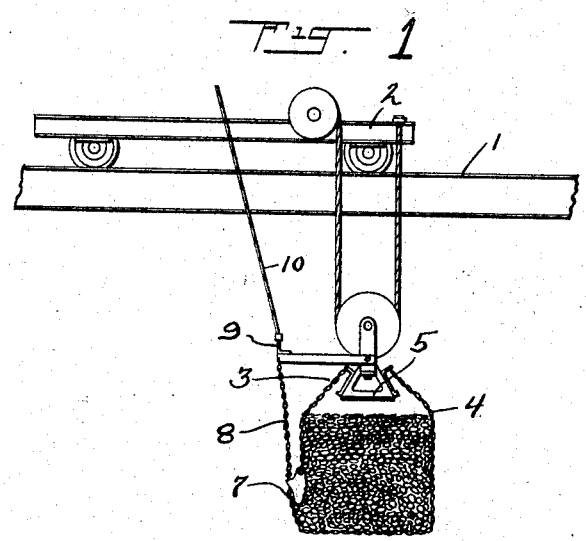
Fig. 1 is a side elevation of a portion of a cane hoist having slings secured by trip hooks embodying the invention.
Figure 2:
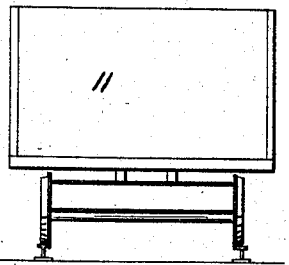
Fig. 2 is a view of a trip hook as shown in Fig. 1 on an enlarged scale and partly in side elevation broken away and partly in section on the line 2—2 of Fig. 3.
Figure 2:
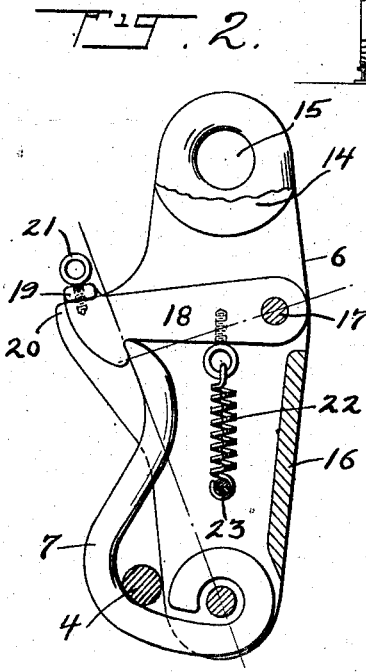
Figure 3:
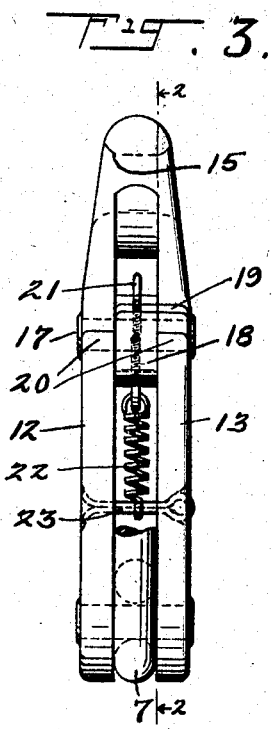
Fig. 3 is a view of the apparatus of Fig. 2 viewed from the left of that figure and with the chain hook partly broken away to show the spring acting upon the chain hook retaining dog.

Referring to the drawings, the apparatus comprises the bridge 1 of a cane hoist, on which runs the carriage 2 from which depends the cane supporting means comprising a plurality of slings about the bundle of cane and spaced along it so as to support it evenly throughout its length. Each of the slings comprises two sections 3 and 4 of chain secured to the bar 5 and at their other ends one of the chain sections 3 is permanently secured to the block 6 of the trip hook while the end of the chain section 4 is secured to the trip hook by the chain hook 7 which is releasably secured in chain retaining position. A pull on the trip chain 8 releases the chain hook and all of the trip chains are secured to a bar 9 extending lengthwise of the cane bundle so that a pull on the cable 10 secured to the bar 9 will trip all the hooks and release all the slings so that the cane may drop into the car 11 waiting to receive it.

The trip hook block is of cast iron having two sides 12 and 13 separated from each other except for a portion 14 at the top having an eye 15 for attachment of the sling chain, and a back 16 extending between the two sides.

Pivoted at 17 in the recess between the sides of the block is a retaining dog 18 for the chain hook. This dog may also be of cast iron and provided with a lug 19 adapted to engage with the shoulders 20 on the block, to limit the downward movement of the dog. The dog is also provided with an eye 21 for attaching the trip chain 8 and promptness and certainty of action of the dog in moving to, and remaining in retaining position is promoted by a spring 22 within the recess in the block, which spring is secured at one end to the pin 23 secured to the block sides and extending across the recess, and at the other end is secured to the dog.

It is to be observed that the plane of the engaging surfaces of the dog 18 and the hook 7 is substantially perpendicular to a line drawn through the pivotal center of dog 18 and also that this plane passes through the pivotal center of the hook 7. The pull on the dog 18 to release the hook therefore will be at right angles to the line of pressure between the hook and do so that the weight of the material in the sling will not have to be overcome in any way in releasing the hook but simply the friction between the engaging parts.

It is further to be observed that the hook 7 and the block in which it is mounted are so formed that there are no ledges or surfaces on which the end of the sling might catch to prevent its release when the hook is tripped; and it is further to be observed that the whole trip hook is of a rugged construction which will stand the hard usage to which apparatus of the kind must be subjected and which nevertheless, are readily and certainly operable under all conditions.

While the invention has been illustrated in what is considered its best application it may have other embodiments without departing from its spirit and is not therefore limited to the structures shown in the drawings.

What I claim is:

1. A trip hook comprising in combination a recessed block, a hook pivoted in said recess, a dog pivoted in said block and lying wholly within said recess and adapted to engage said hook, said block having an exterior shoulder and means on the dog adapted to engage said shoulder outside of the block to prevent said dog from receding to an unaccessible position within said block.

2. A trip hook comprising in combination a block having two sides with a recess therebetween and an opening at one end for receiving a link, of a hook pivoted between said sides adjacent the end of said block opposite said opening, a dog pivoted between said sides and being entirely within said recess and adapted to engage the bill of said hook when in retaining or closed position, a spring within said recess and tending to draw said dog inwardly, means for limiting the inward movement of the dog, said hook extending from its pivotal point outside said recess and then upwardly and into said recess to the point of engagement of the hook and dog, an enclosing space for a link being formed by a substantially vertical side of said block and a portion of said hook between its pivot and its point of engagement with said dog and releasing means secured to said dog upon the same side of the dog pivot as its hook engaging portion.

In testimony whereof I have signed this specification this 10th day of August, 1922.

HORACE F. RUGGLES.